United States Patent [19]

Molitorisz

[11] 4,024,808
[45] May 24, 1977

[54] CUTTING MECHANISM FOR ROTARY COMPACTING MACHINES FOR FIBROUS MATERIAL

[76] Inventor: Joseph Molitorisz, 624 81st Ave. NE., Bellevue, Wash. 98004

[22] Filed: Aug. 18, 1975

[21] Appl. No.: 605,644

Related U.S. Application Data

[63] Continuation-in-part of Ser. No. 327,678, Jan. 29, 1973, Pat. No. 3,899,964.

[52] U.S. Cl. .................................. 100/89; 100/95; 100/DIG. 7; 83/314
[51] Int. Cl.² ..................... B30B 3/04; B26D 1/56
[58] Field of Search ............... 100/40, 86, 89, 94, 100/95, 98, DIG. 7, 78, 82; 56/1; 83/174, 174.1, 314, 318

[56] References Cited

UNITED STATES PATENTS

| | | | |
|---|---|---|---|
| 2,634,810 | 4/1953 | Cox | 83/174 X |
| 2,767,459 | 10/1956 | Holman et al. | 83/314 X |
| 3,691,941 | 9/1972 | Molitorisz | 100/89 |

FOREIGN PATENTS OR APPLICATIONS

| 1,202,114 | 8/1970 | United Kingdom | 100/89 |

*Primary Examiner*—Peter Feldman

[57] ABSTRACT

A rotary compacting machine using rolling-compressing techniques in which loose fibrous material is rolled into a dense continuous cylindrical core in a compression channel. At the discharge end of the compression channel the continuous core is cut to the desired length individual rolls.

The improved cutting mechanism, subject to this invention is self-actuating, and it is capable to maintain the desired cut-length of the individual rolls without any supplementary metering or sensing elements. It overcomes the mechanical difficulties which were inherent in the cutting systems of prior art machines.

2 Claims, 3 Drawing Figures

CUTTING MECHANISM FOR ROTARY COMPACTING MACHINES FOR FIBROUS MATERIAL

CROSS-REFERENCE TO RELATED APPLICATION

This application is a continuation in part of application Ser. No. 327,678, filed Jan. 29, 1973, now U.S. Pat. No. 3,899,964.

BACKGROUND OF THE INVENTION

1. Field of the Invention

This invention pertains to apparatus for severing the dense continuous cylindrical core of fibrous material formed in and discharged from the core forming channel of rotary compacting machines, which are based on the rolling-compressing technique, into individual rolls. The invention has agricultural uses, and also has industrial utility. The servering or cutting technique is of the type in which a power driven rotating circular cutting disk enters the rotating dense fibrous core at preselected and relatively uniform intervals, severing the continuous core into individual rolls with relatively uniform length.

2. Description of the Prior Art.

The development of efficient cutting mechanisms for rolling-compressing machines represented a major effect in prior art. Power driven rotating circular blades, power driven rotating semi-circular and sectional cutting knives were incorporated. Cutting systems were applied where the actual cutting speed was provided by the rotation of the core alone, while in other systems both the core and the cutting element provided the actual cutting speed.

Cutting mechanisms with single as well as with multiple blades were developed.

Indexing and metering systems were applied to actuate the cutting mechanism to achieve uniform cut length for the individual rolls.

Cutting mechanisms were mounted at the discharge end of the compression channel, or were enclosed as integrated part of the compression rollers.

In spite of the broad varieties of these engineering solutions, improvements were necessary to assure dependable performance for the cutting mechanism.

SUMMARY OF THE INVENTION

This invention is directed toward various unique features employed to produce practical and dependable cutting mechanism for mobile or stationary rotary compacting machines using the rolling-compressing technique.

The first and unique feature of my invention is the combination of the mounting and drive for the hub which carries the cutter blade. Through the unique design the hub receives continuous drive to maintain its rotational motion on a non-rotating shaft, and it is also allowed to slide axially on same shaft when the cutter blade is engaged in its cutting phase with the axially moving continuous dense cylindrical core to be severed into individual rolls with desired cut-length. The axial movement of the hub under the action of the force exerted by the axially moving core on the cutter blade is resisted by a coiled compression spring which is co-axial with the non-rotating shaft and is placed between the cutter blade supporting hub and a retaining disk which is rotatably attached to the end of the non-rotating supporting shaft. The magnitude of the axial spring force is such, that is does not interfere with the axial movement of the cutter blade supporting hub while the cutter blade is engaged with the dense cylindrical core, but large enough to force the hub and cutter blade assembly back to their initial position after the blade becomes disengaged from the core. The novelty of this unique combination of the drive and support for the hub and cutter blade assembly can be understood if it is considered that during the cutting phase the cutter blade is forced radially against the compacted dense core which in the mean-time moves axially. The axial or lateral force exerted by the core on the peripheral section of the cutter blade acts as a moment resulting in a binding between the non-rotating supporting shaft and the cutter blade supporting hub, and tends to interfere with the desired relatively free axial movement of the hub and cutter blade assembly. With this invention, by using a non-rotating supporting shaft on which the hub and cutter blade assembly is journally mounted and receives continuous drive for rotation, a continuous kinetic condition exists, eliminating static frictional conditions between the hub and the supporting shaft. The very substantial difference between the values of the static and kinetic coefficients of friction for a given set of components is well known. The kinetic relationships between the non-rotating supporting shaft and the rotating cutter blade supporting hub which is journally mounted on the shaft prevent any severe binding, thus assures minimal resistance in the axial movement of the hub and cutter blade assembly.

The driving power to maintain the rotation of the hub and cutter blade assembly is transmitted by a plurality of pins which are fastened to a hub and chain sprocket assembly which is journally mounted on the same non-rotating supporting shaft that also supports the hub and cutter blade assembly. The chain sprocket and hub assembly receives the drive from one of the powered shaft of the rotary compacting machine. The extending pins are parallel with the non-rotating supporting shaft, and are inserted through properly alligned and sized holes on the cutter blade supporting hub. The length of the pins is made adequate to allow the necessary axial movement of the cutter blade assembly, while continuously transmitting the driving torque to maintain the rotation of the cutter blade. By using properly alligned and oversized holes on the cutter blade supporting hub for the pins the axial resistance against the movement of the cutter blade supporting hub is minimized. The drive pins exert no concernable frictional resistance when the cutter blade is disengaged from the core and the cutter blade and hub assembly is being forced back to their initial retracted position by the coiled spring.

The non-rotating supporting shaft for the cutter blade and hub assembly is secured to an arm which is pivotadly mounted to the frame of the machine. The arm, under the action of an actuating means performes an adjustable swinging motion providing adequate penetration for the cutter blade into the rotating core during the cutting phase, and also providing adequate retraction for the cutter blade from the rotating core for clear disengagement after cutting was completed.

During the cutting phase heat is generated by the friction between the cutter blade and the core. Certain fibrous materials, such as agricultural hay crops, have the tendency to adhere to sliding surfaces, and such tendencies are increased at elevated temperature. As part of this unique cutting mechanism scraper means is incorporated which is locected on the machine to make cntact with the cutter blade on its side which faces the core forming channel, when the cutter blade is at its retracted position. Due to the features of the cutter mechanism, after completing the cutting phase the cutter blade disengages from the core and the cutter blade and hub assembly returns to its retracted position under the action of the coiled compression spring. Under normal operation the cutter blade and hub assembly remains at the initial retracted position for a very short time only, but that time is adequate to remove any adhering particles by the scraper, without causing objectionable wear on te cutter blade.

The cutting edge of the cutter blade requires periodic resharpening. For that purpose a hinged and replaceable sharpener is incorporated which can be swung into a position to touch the cutter blade at the proper angle to resharpen the beveled cutting edge.

DESCRIPTION OF THE PREFERRED EMBODIMENTS

Generally stated, the invention is practiced and applied in compacting machines for fibrous material using the rolling-compressing technique.

Figure 1:
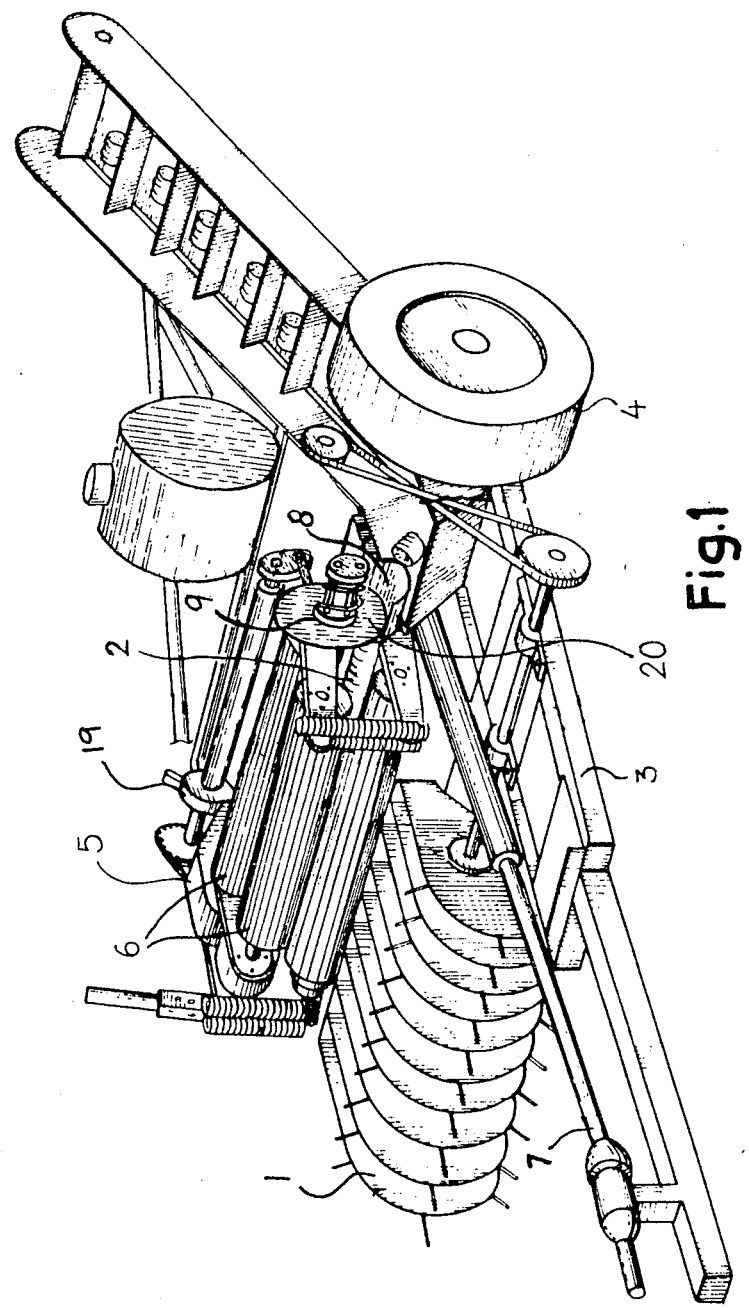
FIG. 1 is an overall perspective view of a rotary compacting machine using the rolling-compressing techinique, embodying the principles of the invention.
Figure 2:
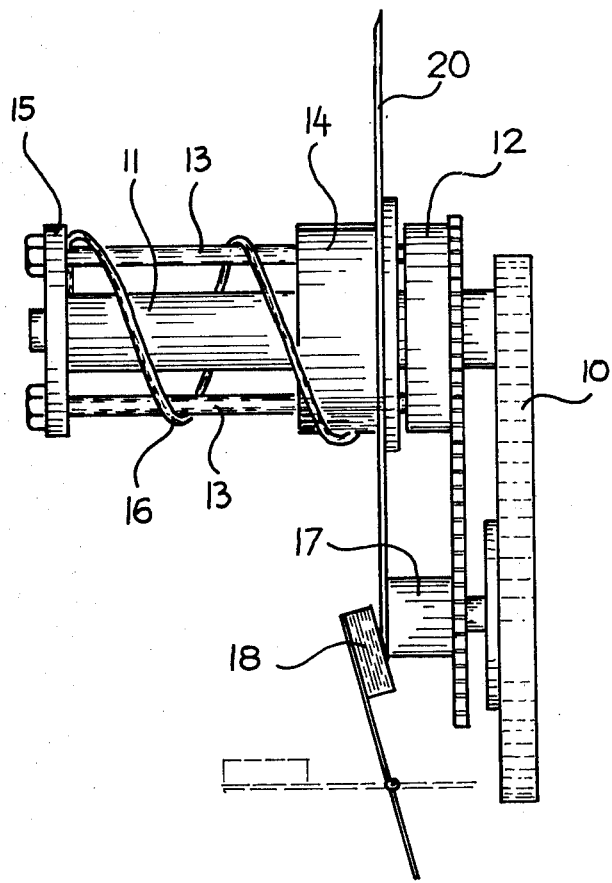
FIG. 2 is a side elevation of the cutter mechanism assembly, illustrating the principle elements of this invention.
Figure 3:
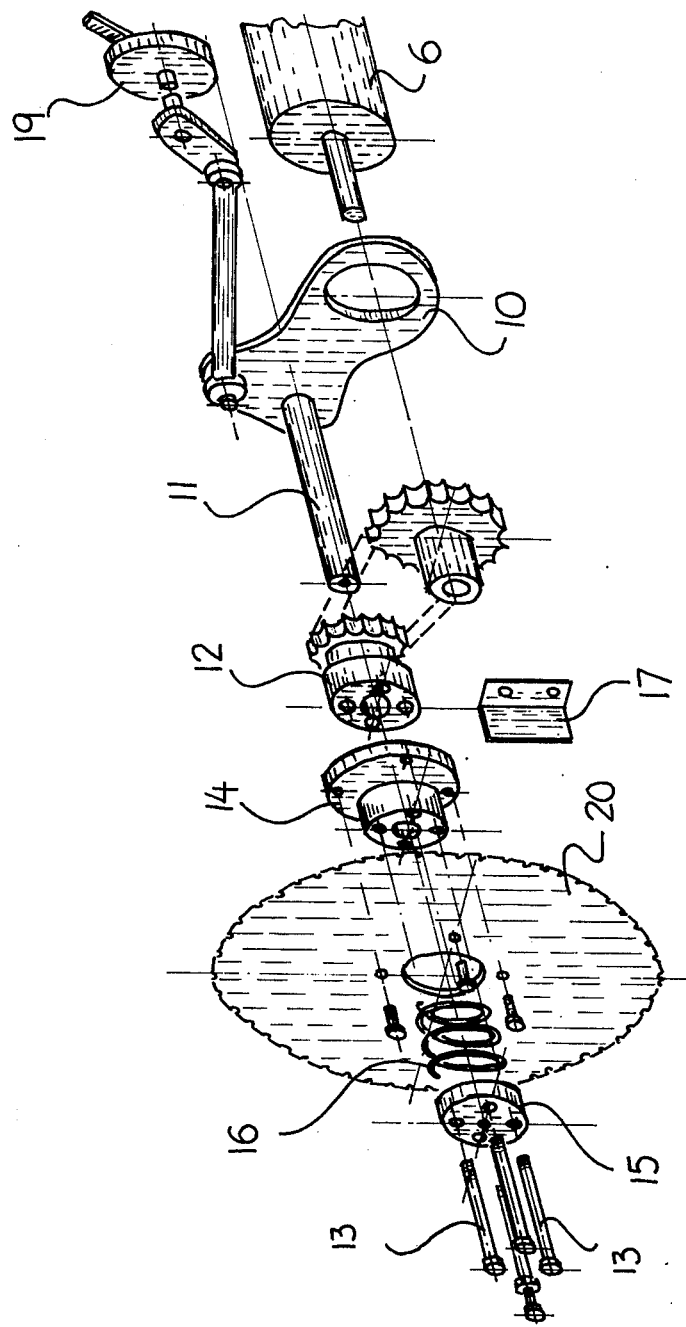
FIG. 3 is an exploded view of the cutter mechanism assembly illustrating the principles of this invention.

The mobile machine illustrated on FIG. 1 comprising a pick-up means 1, a frame 3 which is supported by wheels 4. The machine can be drawn by a prime mover such as a tractor. In the embodiment illustrated, the means for compressing the fibrous material into a cylindrical core 2 includes four compression rollers 6. The rollers are driven by a suitable drive train 7 which is connected to the power take-off of the prime mover. The rollers are circumferentially spaced to confine the core forming channel. A space is provided between two adjacent rollers as a transverse inlet into the channel. The axial force components of the compression roller system provide the core formed in the channel with an axial force to move the core either toward the discharge exit 8 of the channel, or toward the driven end of the channel.

The main power transmission system 5 is pivotally supported allowing a limited rotation for the entire system to form a skew angle by the compression rollers relative to the core forming channel for the axial movement of the core. The limited and adjustable rotation of the main power transmission system is achieved automatically by utilizing the acting torques. The weight of the main power transmission assembly together with other biasing means urges it to an angular position at which the compression rollers have a small negative skew angle. The input torque which drives the compression rollers, tends to cause a rotation of the main power transmission assembly placing the compression rollers in a positive skew angle and moving the compressed core toward the discharge exit 8 of the channel.

The cutter assembly 9 is mounted at the discharge exit 8 of the compression channel. The arm 10 to which the cutter assembly is secured is pivotally supported to the frame of the machine. Shaft 11 is positively secured to arm 10. The hub and chain sprocket assembly 12 is journally mounted on shaft 11 allowing free rotation but restricted from axial movement.

The cutter blade supporting hub 14 is journally mounted on shaft 11 allowing free rotation and also axial sliding movement. The retaining disk 15 is journally mounted on shaft 11 for free rotation, but it is restricted from axial movement. The drive pins 13 are inserted through properly alligned and over-sized holes on retaining disk 15 and cutter blade supporting hub 14, and are secured to hub assembly 12. The coiled compression spring 16 is placed between the retaining disk 15 and the cutter blade supporting hub 14. The free sliding distance of the cutter blade supporting hub 14 along the supporting shaft 11 is adequately laid out to allow the cutter blade 20 to move axially while engaged with the core 2. The hub and chain sprocket assembly 12 receives its drive from any suitable powered shaft of the compacting machine, such as the shaft of one of the compression rollers.

The scraper means 17 is secured to the frame of the machine in such a position that it makes contact with the cutter blade when it is in its retracted position and under the action of the coiled compression spring 16.

The hinged sharpener 18 is secured to the frame of the machine, and it is positioned such that when forced against the rotating cutter blade it resharpens the cutting blade with the desired beveled cutting edge.

The pivotally mounted arm 10 is actuated by clutch assembly 19.

While the preferred forms of the invention have been illustrated, and described, it should be understood that changes may be made without departing from the principles thereof. Accordingly, the invention is to be limited only by a literal interpretation of the claims appended hereto.

I claim:

1. A cutting mechanism to severe the continuous dense cylindrical core formed from fibrous material in rotary compacting machines using the rolling-compressing technique, into desired length individual rolls, said cutting mechanism being positioned at the discharge exit of the core forming channel of said rotary compacting machines, comprising; a shaft which is positively secured to a pivotally mounted arm, said shaft being restricted from rotational motion about its own axis, and also being restricted from any motion relative to said pivotally mounted arm, a cutter blade fixedly mounted on a cutter blade supporting hub, said supporting hub journally mounted on said shaft providing free rotational and axial movement of said blade supporting hub with respect to said shaft, a hub and chain sprocket assembly journally mounted on said shaft allowing free rotational motion for said hub and chain sprocket assembly on said shaft but being restricted from axial motion along shaft, a retaining disk journally mounted on an end of said shaft providing free rotational motion thereof on said shaft but being restricted from axial motion along said shaft, a plurality of drive pins radially spaced and extending parallel with said shaft and being inserted through aligned and adequately over sized holes on said retaining disk and on said cutter blade supporting hub and being secured into said hub and chain sprocket assembly, a coiled compression spring being placed between said retaining disk and said cutter blade supporting hub, said drive pins transmitting the driving torque from said hub and and chain sprocket assembly to said cutter blade supporting hub at any axial position of said cutter blade supporting hub on said shaft, said drive pins also providing additional stabilizing support for said cutter blade supporting hub, said coiled compression spring urging said cutter blade supporting hub on said shaft toward said hub and chain sprocket assembly, said cutter blade supporting hub being continuously rotated by said drive pins, said pivotally mounted arm to which said shaft is positively secured being activated by suitable means to cause the engaging and disengaging of said cutter blade with said cylindrical core at desired frequency to severe said continuous dense cylindrical core into cut length individual rolls.

2. A cutting mechanism for rotary compacting machines as claimed in claim 1 wherein a scraper means is incorporated to remove any particles or material which may adhere to said cutter blade, said scraper means being positioned relative to said cutter blade to make contact when said cutter blade is being held at its retracted position by said coiled compression spring.

* * * * *